June 19, 1956 L. W. WIGHTMAN 2,751,265
SHAFT BEARING
Filed Dec. 9, 1953
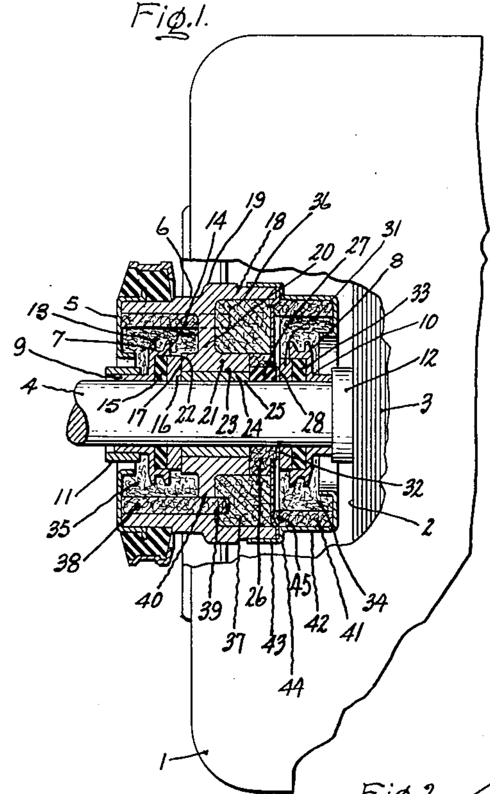
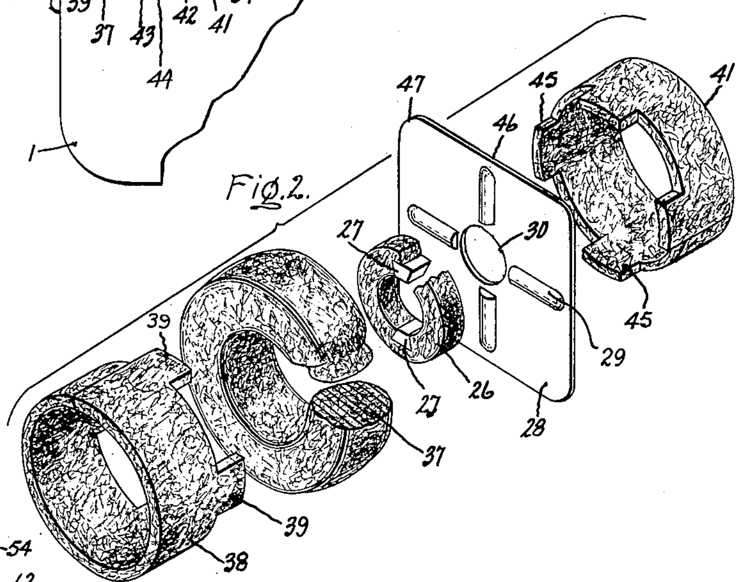
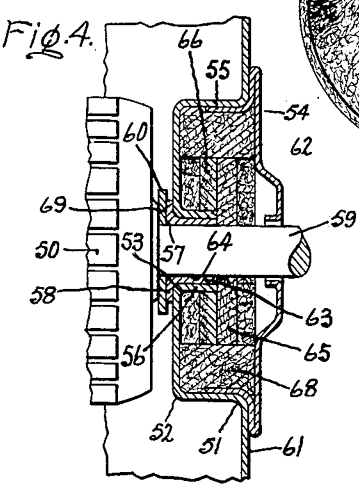
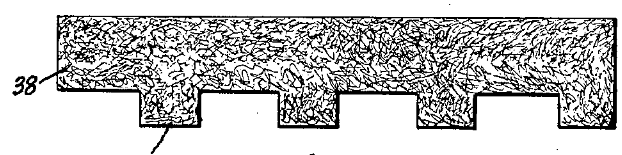
Inventor:
Lawrance W. Wightman,
by Robert G. Teil
His Attorney.

United States Patent Office 2,751,265 Patented June 19, 1956

2,751,265

SHAFT BEARING

Lawrance W. Wightman, Fort Wayne, Ind., assignor to General Electric Company, a corporation of New York Application December 9, 1953, Serial No. 397,202

19 Claims. (Cl. 308—132)

This invention relates to bearings and more particularly to improved bearing lubrication.

It is highly desirable in many applications of electric motors that the motor be capable of use in many different positions, varying all the way from the horizontal to the vertical with either end of the motor up in the vertical position. A principal obstacle to such use of an electric motor has been the difficulty of obtaining adequate lubrication of the bearings when the motor was put in a variety of positions. It generally occurred that in certain positions a part of the bearing would be starved for lubrication and would, therefore, wear much too rapidly. Various means have been essayed to overcome this difficulty. For instance, it has been suggested that the motor shaft be grooved so as to provide a positive pumping path for the lubricant. In such a case the grooves would run in opposite directions from the point where the lubricant was put in contact with the shaft, so that the lubricant would go in opposite directions along the shaft from that point. Use of this method, however, has precluded the use of reversible motors in any position since the grooves would then have an effect directly opposite to that desired. It is, therefore, desirable to effect a bearing wherein lubrication will be assured throughout the bearing at all times in whatever direction the motor is running.

An object of this invention is, therefore, to provide an improved bearing having the above mentioned qualities.

Further objects and advantages of this invention will become apparent and the invention will be better understood by reference to the following description and the accompanying drawing; and the features of novelty which characterize this invention will be pointed out with particularity in the claims annexed to and forming a part of this specification.

This invention in its broadest aspects provides a bearing having a lubricating wick extending around the entire periphery of the shaft which is rotatably supported by the improved bearing. The bearing itself is preferably constructed with a low length-diameter ratio in such a manner that a radial load on the shaft in any direction will tend to cause the bearing to align against the loaded side of the shaft. Together with the 360 degree wick around the end of the bearing, the shape of the bearing will avoid resistance to oil flow from the wick to the unloaded portion of the bearing. This is achieved because there will tend to be a pressure lower than atmospheric in the unloaded area and because capillary action will induce the lubricant to flow into this area. There will also be a sufficiency of lubricant ready to flow into the unloaded portion because of the wiping and spreading action created by the shaft rotating against the wick.

In the drawing,

Fig. 1 is a side view, partly in cross section to show the improved bearing of the switch end of an electric motor;

Fig. 2 is an exploded view in perspective of the main features of the improved bearing of Fig. 1;

Fig. 3 is a view of one of the felt elements of Fig. 2 before it has been rolled into its final shape; and Fig. 4 is a side view, partly in cross section to show the bearing construction of the switch end of a motor having a modified type of improved bearing.

Referring now to Fig. 1 of the drawing there is shown a housing 1 of an electric motor which is not shown except for partial view of a stator 2 which is made up of thin laminations 3. A shaft 4 extends from the rotor (not shown) of the motor. Shaft 4 is rotatably supported within a bearing generally indicated at 5 which is located at 6 in housing 1.

A pair of oil throwers 7 and 8 are secured to shaft 4. This is effected by sliding flanges 9 and 10 of oil throwers 7 and 8 respectively over shaft 4 in slip fit relation. A ring 11 is then press fitted over flange 9 of oil thrower 7 in such a way that it forces flange 9 against shaft 4 thereby maintaining shaft 4, flange 9 and ring 11 securely together. A ring 12 achieves the same result for oil thrower 8 by means of a press fit with flange 10. Oil thrower 7 has a pair of peaks 13 whose function will be explained later. A recess 14 is formed in oil thrower 7 wherein a pair of washers 15 and 16 are positioned. Washer 15 is made of a relatively flexible material such as rubber so as to be able to yield slightly under pressure. Washer 16 has a thrust surface 17 whose function will be more fully explained later. A member 18, which is integral with housing 1, forms, by means of part 19, the bearing housing. Part 19 is connected by spokes 20 to a bearing support 21 having at one side a bearing surface 22. Attached to the inner periphery 23 of support 21 is a bearing 24 having a surface 25 which bears against rotatable shaft 4.

Referring now to Figs. 1 and 2 together, there appears an absorbent wick 26 which extends completely around shaft 4. A number of wedges 27 (two in the present embodiment) are inserted in wick 26 so as to form part of the inner surface of the wick. Wedges 27 are made of a material such as laminated plastic or rubber which is harder than the material, usually felt, comprising wick 26. Felt is a preferred material because it has a quality of springiness which tends to force wedges 27 inwardly toward shaft 4. Directly beside wick 26 there is placed around shaft 4 a metal plate 28 which has grooves 29 extending outwardly from the center and which are so formed that they face away from wick 26. The opening 30 of plate 28 is large enough so that it does not bear on shaft 4. On the grooved side of plate 28 there is a thrust washer 31 set in oil thrower 8 in the same manner that washer 16 is secured to oil thrower 7. Washer 31 has a bearing surface 32 and abuts against a resilient washer 33 in the same manner that washer 16 abuts against resilient washer 15. Within the space 36 formed by member 18, and surrounding wick 26, is packing 37 which may, as is shown, be formed of a sewed wick forced into a circular shape.

Referring for an instant to Fig. 3 there is seen a straight piece 38 of a material such as felt having extending therefrom four fingers 39. The strip in Fig. 3 is formed into a circle, as can be seen in Fig. 2, with the fingers 39 extending as shown. Felt circle 38 is maintained within part 19 of member 18 so that there is a space 35 between felt circle 38 and oil thrower 7; the fingers 39 extend through openings 40 between spokes 20 into packing 37 to connect piece 38 and packing 37. A similar circle of felt 41 is placed within a retainer member 42 so that there is a space 34 between felt circle 41 and oil thrower 7. Member 42 is secured at 43 to member 18 and has a bend 44 to secure plate 28 in place at its four corners 47. Felt ring 41 has fingers 45 similar to fingers 39 of ring 38. These fingers extend over the flat edges 46 of plate 28 and into packing 37.

Referring now to Fig. 1, the lubricating operation of the bearing during rotation of shaft 4 will now be described. Lubricant from wick 26 will be wiped onto the surface of shaft 4; since the wick extends all the way around the shaft this will be true whatever the position of the motor. As lubricant is deposited on the surface of shaft 4, wedges 27, since they are harder than wick 26 and are not absorbent, will force the lubricant along the shaft away from wick 26. This will be achieved in both directions whatever the position of the bearing because of the fact that the action of wedges 27 being forced inwardly by the springiness of wick 26 will force the oil away therefrom. Wedges 27 may be so formed that one of them will force the lubricant in one direction and the other of them will force it in the other direction. As has been previously explained the number of wedges is not necessarily limited to 2; instead, 3 or 4 or more wedges may be used to achieve more frequent forcing of the lubricant away from wick 26.

Following first the oil flow toward the left in Fig. 1 the oil is pushed by wedges 27 between shaft 4 and bearing surface 25 to provide lubrication for this bearing surface. This action is helped by the low length to diameter ratio of bearing surface 25, since the bearing is formed so as to align itself with a radial load and thereby offer less resistance to flow in the unloaded areas. When the lubricant reaches the end of bearing surface 25 it is forced outwardly from shaft 4 by centrifugal action between thrust bearing surface 17 and bearing surface 22 of support 21. Thus, the lubricant traveling to the left lubricates the radial bearing surface 25 and the thrust bearing surface 22. The lubricant then travels outwardly, still under the influence of the centrifugal force, to peaks 13 of oil thrower 7 whence it is thrown out to felt ring 38. By means of capillary action the lubricant then travels through felt ring 38, fingers 39, packing 37 and back to wick 36.

The lubricant traveling to the right of wick 26 first travels under plate 28 and then is forced by centrifugal action and with the help of grooves 29 up between plate 28 and thrust bearing 31 thereby providing adequate lubrication for the thrust bearing surface 32. The lubricant is then carried to peaks 13 of oil thrower 8 which throw it out to felt ring 41; capillary action then carries the lubricant through felt ring 41, fingers 45, and packing 37 back to wick 26.

It will be seen from the above description that this invention provides a bearing having both radial and thrust bearing surfaces and wherein all such surfaces are insured adequate lubrication whatever position the motor may be in when utilized.

Referring now to Fig. 4, there is shown a modification which permits extremely economical manufacture. A rotor 50 of an electric motor (not otherwise shown) drives shaft 59; secured thereto is a thrust washer 60 which is placed directly in front of rotor 50. Housing 61 of the motor is bent as at 51, 52 and 53 to form a housing in which a bearing, generally indicated as 62, may be placed. Bearing 62 is further secured by member 54, which is in turn secured to housing 61 at 55 by frictional engagement or any other desired means. Housing 61 terminates in a flange 56 which surrounds a circular bearing member 63 having surface 64 in bearing relationship with shaft 59. Member 63 is bent as at 57 to form a flange 58 having a bearing surface 69 in bearing relation with thrust washer 60. A circular wick 65 completely surrounds shaft 59 and is located directly abutting an end of member 63. A second circular wick-like member 66 abuts wick 65 on one side. Member 65 fits around flange 56 and does not contact shaft 59. A mass of packing 68 surrounds wick 65 and member 66 and is maintained in place by member 54 and housing 61.

It will be seen that when shaft 59 is rotated lubricant will be wiped onto it from wick 65. This lubricant will then travel along shaft 59 between it and bearing surface 64. The lubrication being improved as in the embodiment of Fig. 1, by the small length-diameter ratio of the radial bearing surface 64. When it reaches the end of bearing surface 64, the lubricant will be forced by centrifugal action away from shaft 59 between flange 58 and thrust washer 60 thereby lubricating thrust bearing surface 69. This lubrication will be achieved whatever position the motor may be in because of the complete encirclement of shaft 59 by wick 65, and because the relative shortness of bearing surface 64 will permit lubricant to reach and be forced outwardly along surface 69. Because of the way housing 61 extends down upon member 63 a high radial load on shaft 59 in any direction will cause member 63 to tend to align with it against the loaded side of shaft 59. The supply of lubricant is maintained within packing 68 and member 66.

It will be seen that this modification of my invention also provides positive lubrication both for the radial and thrust bearing surfaces in all positions of use of the motor.

While this invention has been explained by describing particular embodiments thereof, it will be apparent that improvements and modifications may be made without departing from the scope of the invention as defined in the appended claims.

What I claim as new and desire to secure by Letters Patent of the United States is:

1. In a device having a rotatable shaft substantially within a housing, bearing means rotatably supporting said shaft and secured to said housing; said bearing means comprising a wick of lubricant absorbent material around said shaft and in contact therewith over a major part of the periphery thereof, radial bearing means around a portion of said shaft and having an end adjacent said wick, said radial bearing means extending for a short distance along said shaft relative to the diameter of said shaft, thrust bearing means for said shaft on the other side of said radial bearing means from said wick, a bearing housing secured to said first housing and supporting said radial bearing means and said thrust bearing means and forming a space therearound, said radial bearing means being supported intermediate its ends thereby to cause said bearing to align itself against the loaded side of said shaft when the same is under radial load, and lubricant absorbent material maintained within said space adjacent said bearing housing and in contact with said wick.

2. In a device having a rotatable shaft substantially within a housing, bearing means rotatably supporting said shaft and secured to said housing; said bearing means comprising a wick of lubricant absorbent material around said shaft and in contact therewith over a major part of the periphery thereof, radial bearing means around a portion of said shaft and having an end adjacent said wick, said radial bearing means extending for a short distance along said shaft relative to the diameter of the shaft, thrust bearing means for said shaft adjacent said radial bearing means, a bearing housing secured to said first housing and supporting said radial bearing means and said thrust bearing means and forming a space therearound, said radial bearing means being supported intermediate its ends thereby to cause said bearing to align itself against the loaded side of said shaft when the same is under radial load, and lubricant absorbent material maintained within said space adjacent said bearing housing and in contact with said wick.

3. In a machine having a housing and a rotatable shaft therein, bearing means rotatably supporting said shaft and secured to said housing; said bearing means comprising a member having a bearing surface in radial bearing contact with said shaft, said surface extending for a relatively short distance along said shaft relative to the diameter of said shaft, a thrust washer secured to said shaft, said member having a second surface in bearing relation with said thrust washer, a wick adjacent an end of said member, said wick extending around said shaft and having a wiping contact therewith whereby lubricant may be wiped off said wick onto said shaft and forced across said radial bearing surface and across said thrust bearing surface, said member having said radial bearing surface being supported intermediate the ends of said surface to cause the same to align itself against the loaded side of said shaft when the same is under radial load, and means for returning said lubricant to said wick.

4. In a machine having a housing and a rotatable shaft therein, bearing means rotatably supporting said shaft and secured to said housing; said bearing means comprising a member having a bearing surface in radial bearing contact with said shaft, a thrust washer secured to said shaft, said member having a second surface in bearing relation to said thrust washer, a wick adjacent said member and formed of absorbent material, a wedge of relatively hard non-absorbent material secured in said wick and having a surface in contact with said shaft, said wick extending around said shaft and having a wiping contact therewith whereby lubricant may be wiped off said wick onto said shaft, said wick being adapted to wipe lubricant on said shaft and said wedge being adapted to force said lubricant along said shaft away from said wick, and means for returning said lubricant to said wick.

5. In a machine having a housing and a rotatable shaft therein, bearing means secured to said housing and rotatably supporting said shaft; said bearing means comprising a bearing housing secured in said machine housing, said bearing housing comprising spokes extending inwardly from the connection of said machine housing and said bearing housing, a hollow cylindrical member secured at the inner end of said spokes, said cylindrical member having an inner surface adapted to bear radially upon said shaft, said shaft extending through said cylindrical member, said cylindrical member being secured at the inner end of said spokes intermediate the ends of said radial bearing surface thereby to cause said radial bearing surface to align itself against the loaded side of said shaft when the same is under radial load, a thrust washer secured around said shaft, said cylindrical member having an end surface adapted to bear against a surface of said thrust washer, a 360° wick around said shaft and abutting against an end of said cylindrical member, said wick being adapted to wipe lubricant on said shaft whereby said lubricant travels along said shaft across said radial bearing surface and away from said shaft across said thrust bearing surface, and means for returning said lubricant to said wick.

6. In a machine having a housing and a rotatable shaft therein, bearing means secured to said housing and rotatably supporting said shaft, said bearing means comprising a bearing housing secured in said machine housing, said bearing housing comprising spokes extending inwardly from the connection of said machine housing and said bearing housing, a hollow cylindrical member secured at the inner end of said spokes, said cylindrical member having an inner surface adapted to bear radially upon said shaft, said cylindrical member being secured at the inner end of said spokes intermediate the ends of said radial bearing surface thereby to cause the same to align itself against the loaded side of said shaft when the same is under radial load, said radial bearing surface extending for a relatively short distance along said shaft relative to the diameter of said shaft, said shaft extending through said cylindrical member, a thrust washer secured around said shaft, said cylindrical member having an end surface adapted to bear against a surface of said thrust washer, a 360° wick around said shaft and abutting against an end of said cylindrical member, said wick being adapted to wipe lubricant on said shaft whereby said lubricant travels along said shaft across said radial bearing surface and away from said shaft across said thrust bearing surface and means for returning said lubricant to said wick comprising absorbent material surrounding and spaced from said thrust bearing, absorbent packing around said wick, and fingers of absorbent material extending between said spokes and interconnecting said packing around said thrust bearing and said packing around said wick.

7. In a machine having a housing and a rotatable shaft therein, bearing means secured to said housing and rotatably supporting said shaft; said bearing means comprising a bearing housing secured in said machine housing, said bearing housing comprising spokes extending inwardly from the connection of said machine housing and said bearing housing, a hollow cylindrical member secured at the inner end of said spokes, said cylindrical member having an inner surface adapted to bear radially upon said shaft, said radial bearing surface extending for a relatively short distance along said shaft relative to the diameter of said shaft, said shaft extending through said cylindrical member, said cylindrical member being secured to said spokes intermediate the ends of said radial bearing surface thereby to cause said radial bearing surface to align itself against the loaded side of said shaft when the same is under radial load, a thrust washer secured around said shaft, said cylindrical member having an end surface adapted to bear against a surface of said thrust washer, a 360° wick around said shaft and abutting against an end of said cylindrical member, said wick being adapted to wipe lubricant on said shaft whereby said lubricant travels along said shaft across said radial bearing surface and away from said shaft across said thrust bearing surface, and means for returning said lubricant to said wick comprising absorbent material surrounding and spaced from said thrust bearing and absorbent packing surrounding said wick.

8. In a machine having a housing and a rotatable shaft therein, bearing means secured to said housing and rotatably supporting said shaft; said bearing means comprising a bearing housing secured in said machine housing, said bearing housing comprising spokes extending inwardly from the connection of said machine housing and said bearing housing, a hollow cylindrical member secured at the inner end of said spokes, said cylindrical member having an inner surface adapted to bear radially upon said shaft, said radial bearing surface extending for a relatively short distance along said shaft relative to the diameter of said shaft, said shaft extending through said cylindrical member, said cylindrical member being secured to said spokes intermediate the ends of said radial bearing surface thereby to cause said radial bearing surface to align itself against the loaded side of said shaft when the same remains under radial load, a thrust washer secured around said shaft, said cylindrical member having an end surface adapted to bear against a surface of said thrust washer, a 360° wick around said shaft and abutting against an end of said cylindrical member, said wick being adapted to wipe lubricant on said shaft whereby said lubricant travels along said shaft across said radial bearing surface and away from said shaft across said thrust bearing surface, and means for returning said lubricant to said wick comprising a ring of absorbent material surrounding and spaced from said thrust bearing, additional absorbent packing around said wick, and fingers extending from said ring through said spokes into said absorbent packing around said wick.

9. In a machine having a housing and a rotatable shaft therein, bearing means secured to said housing and rotatably supporting said shaft; said bearing means comprising a bearing housing secured in said machine housing, said bearing housing comprising spokes extending inwardly from the connection of said machine housing and said bearing housing, a hollow cylindrical member secured at the inner end of said spokes, said cylindrical member having an inner surface adapted to bear radially upon said shaft, said shaft extending through said cylindrical member, said radial bearing surface extending for a relatively short distance along said shaft relative to the diameter of said shaft, said cylindrical member being secured to said spokes intermediate the ends of said radial bearing surface thereby to cause said bearing to align itself against the loaded side of said shaft when the same is under radial load, a thrust washer secured around said shaft adjacent an end of said cylindrical member and having a surface in bearing relation with the surface of said end of said cylindrical member, a wick of soft absorbent material abutting the other end of said cylindrical member and surrounding said shaft, a flat member abutting said wick and surrounding said shaft in spaced relation therewith, a second thrust washer secured to said shaft and in bearing relation with a face of said flat member, said wick being adapted to wipe lubricant on said shaft whereby said lubricant travels along said shaft in opposite directions across all of said bearing surfaces, and means for returning said lubricant to said wick.

10. In a machine having a housing and a rotatable shaft therein, bearing means secured to said housing and rotatably supporting said shaft; said bearing means comprising a bearing housing integral with said machine housing, said bearing housing comprising spokes extending inwardly from the connection of said machine housing and said bearing housing, a hollow cylindrical member secured at the inner end of said spokes, said cylindrical member having an inner surface adapted to bear radially upon said shaft, said shaft extending through said cylindrical member, a thrust washer secured around said shaft adjacent an end of said cylindrical member and having a surface in bearing relation with the surface of said end of said cylindrical member, a wick of soft absorbent material abutting the other end of said cylindrical member and surrounding said shaft, a wedge of relatively hard nonabsorbent material secured in said wick and having a surface in contact with said shaft, a flat member abutting said wick and surrounding said shaft and spaced therefrom, a second thrust washer secured to said shaft and in bearing relation with a face of said flat member, said wick being adapted to wipe lubricant on said shaft and said wedge being adapted to force said lubricant along said shaft away from said wick whereby said lubricant travels along said shaft in opposite directions across all of said bearing surfaces, and means for returning said lubricant to said wick.

11. In a machine having a housing and a rotatable shaft therein, bearing means secured to said housing and rotatably supporting said shaft; said bearing means comprising a bearing housing integral with said machine housing, said bearing housing comprising spokes extending inwardly from the connection of said machine housing and said bearing housing, a hollow cylindrical member secured at the inner end of said spokes, a thin hollow member secured to the inner surface of said cylindrical member and having its inner surface in radial bearing relation with said shaft, said radial bearing surface extending for a relatively short distance along said shaft relative to the diameter of said shaft, a thrust washer secured around said shaft, said cylindrical member having an end surface adapted to bear against a surface of said thrust washer, a wick of soft absorbent material abutting the other end of said cylindrical member and contiguously surrounding said shaft, a plurality of wedges of relatively hard nonabsorbent material secured in said wick, said wedges each having a surface in contact with said shaft, a flat member abutting said wick and surrounding said shaft and spaced therefrom, said flat member having grooves extending radially away from said shaft formed therein on the side away from said wick, a second thrust washer secured to said shaft and in bearing relation with the grooved side of said flat member, said wick being adapted to wipe lubricant on said shaft and said wedges being adapted to force said lubricant along said shaft away from said wick in both directions whereby part of said lubricant travels along said shaft across said radial bearing surface and subsequently travels away from said shaft across the face of said first thrust washer and another part of said lubricant travels along said shaft beneath said flat member and subsequently travels away from said shaft in said grooves across the face of said second thrust washer, and means for returning said lubricant to said wick.

12. In a machine having a housing and a rotatable shaft therein, bearing means secured to said housing and rotatably supporting said shaft; said bearing means comprising a bearing housing integral with said machine housing, said bearing housing comprising spokes extending inwardly from the connection of said machine housing and said bearing housing, a hollow cylindrical member secured at the inner end of said spokes, a thin hollow member secured to the inner surface of said cylindrical member and having its inner surface in radial bearing relation with said shaft, said radial bearing surface extending for a relatively short distance along said shaft relative to the diameter of said shaft, a thrust washer secured around said shaft, said cylindrical member having an end surface adapted to bear against a surface of said thrust washer, a wick of soft absorbent material abutting the other end of said cylindrical member and contiguously surrounding said shaft, a plurality of wedges of relatively hard nonabsorbent material secured in said wick, said wedges each having a surface in contact with said shaft, a flat member abutting said wick and surrounding said shaft and spaced therefrom, said flat member having grooves extending radially away from said shaft formed therein on the side away from said wick, a second thrust washer secured to said shaft and in bearing relation with the grooved side of said flat member, said wick being adapted to wipe lubricant on said shaft and said wedges being adapted to force said lubricant along said shaft away from said wick in both directions whereby part of said lubricant travels along said shaft across said radial bearing surface and subsequently travels away from said shaft across the face of said first thrust washer and another part of said lubricant travels along said shaft beneath said flat member and subsequently travels away from said shaft in said grooves across the face of said second thrust washer, and means for returning said lubricant to said wick comprising a pair of annular peaked members secured respectively to said thrust washers, an absorbent ring surrounding and spaced from each of said annular members, absorbent packing surrounding said wick, absorbent fingers extending from one of said rings through said spokes and into said packing surrounding said wick, and absorbent fingers extending from the other of said rings over said flat member and into said packing surrounding said wick.

13. In a machine having a housing and a rotatable shaft therein, bearing means rotatably supporting said shaft and secured to said housing comprising a member having a surface in radial bearing contact with said shaft, said radial bearing surface extending for a relatively short distance relative to the diameter of said shaft, a flange extending radially from one end of said member, a thrust washer secured to said shaft and having a surface in thrust bearing contact with said flange, and a lubricant impregnable wick adjacent the other end of said member and contiguously surrounding said shaft, said bearing means being secured to said housing intermediate the ends of said radial bearing surface thereby to cause said radial bearing surface to align itself against the loaded side of said shaft when the same is under radial load.

14. In a machine having a housing and a rotatable shaft therein, bearing means rotatably supporting said shaft and secured to said housing comprising a member having a surface in radial bearing contact with said shaft, said radial bearing surface extending for a relatively short distance relative to the diameter of said shaft, a flange extending radially from one end of said member, a thrust washer secured to said shaft and having a surface in thrust bearing contact with said flange, and a lubricant impregnable wick adjacent the other end of said member and contiguously surrounding said shaft, said housing being so formed as to support said member and being secured to said member intermediate the ends of said radical bearing surface and parallel with said member and said flange.

15. In a machine having a housing and a rotatable shaft therein, bearing means rotatably supporting said shaft and secured to said housing comprising a member having a surface in radial bearing contact with said shaft, said radial bearing surface extending for a relatively short distance relative to the diameter of said shaft, a flange extending radially from one end of said member, a thrust washer secured to said shaft and having a surface in thrust bearing contact with said flange, a lubricant impregnable wick adjacent the other end of said member and contiguously surrounding said shaft, said housing being so formed as to support said member and being secured to said member intermediate the ends of said radial bearing surface and parallel with said member and said flange, and lubricant absorbent material entirely surrounding said wick.

16. In a machine having a housing and a rotatable shaft therein, bearing means rotatably supporting said shaft and secured to said housing comprising a member having a surface in radial bearing contact with said shaft, said radial bearing surface extending for a relatively short distance relative to the diameter of said shaft, a flange extending radially from one end of said member, a thrust washer secured to said shaft and having a surface in thrust bearing contact with said flange, a lubricant impregnable wick adjacent the other end of said member and contiguously surrounding said shaft, said housing being so formed as to support said member and being secured to said member intermediate the ends of said radial bearing surface and parallel with said member and said flange, lubricant absorbent material entirely surrounding said wick, and a closure member co-operable with said formed housing to enclose said wick and said absorbent material.

17. In a device having a rotatable shaft substantially within a housing, bearing means rotatably supporting said shaft and secured to said housing; said bearing means comprising a wick of lubricant absorbent material around said shaft and in contact therewith over a major part of the periphery thereof, a wedge of relatively hard non-absorbent material secured in said wick and having a surface in contact with said shaft, radial bearing means around a portion of said shaft and adjacent said wick, thrust bearing means for said shaft adjacent said radial bearing means, a bearing housing secured to said first housing and supporting said radial bearing means and said thrust bearing means and forming a space therearound, and lubricant absorbent material maintained within said space adjacent said bearing housing and in contact with said wick, said wick being adapted to wipe lubricant on said shaft and said wedge being adapted to force said lubricant along said shaft away from said wick whereby said lubricant travels along said shaft in opposite directions across all of said bearing surfaces.

18. In a machine having a housing and a rotatable shaft therein, bearing means secured to said housing and rotatably supporting said shaft, said bearing means comprising a bearing housing secured in said machine housing, said bearing housing comprising spokes extending inwardly from the connection of said machine housing and said bearing housing, a hollow cylindrical member secured at the inner end of said spokes, said cylindrical member having an inner surface adapted to bear radially upon said shaft, said shaft extending through said cylindrical member, a thrust washer secured around said shaft, said cylindrical member having an end surface adapted to bear against a surface of said thrust washer, a 360° wick around said shaft and abutting against an end of said cylindrical member, a wedge of relatively hard non-absorbent material secured in said wick having a surface in contact with said shaft, said wick being adapted to wipe lubricant on said shaft and said wedge being adapted to force said lubricant along said shaft away from said wick whereby said lubricant travels along said shaft across said radial bearing surface and away from said shaft across said thrust bearing surface, and means for returning said lubricant to said wick.

19. In a machine having a housing and a rotatable shaft therein, bearing means rotatably supporting said shaft and secured to said housing; said bearing means comprising a member having a bearing surface in radial bearing contact with said shaft, said surface extending for a relatively short distance along said shaft relative to the diameter of said shaft, a thrust washer secured to said shaft, said member having a second surface in bearing relation with said thrust washer, a wick of absorbent material adjacent said member, said wick extending around said shaft and having a wiping contact therewith, a wedge of relatively hard non-absorbent material secured in said wick and having a surface in contact with said shaft, said wick being adapted to wipe said lubricant on said shaft and said wedge being adapted to force said lubricant along said shaft away from said wick whereby said lubricant travel along said shaft in opposite directions across said radial bearing surface and across said thrust bearings surface, and means for returning said lubricant to said wick.

References Cited in the file of this patent

UNITED STATES PATENTS

| | | |
|---|---|---|
| 1,563,380 | Kunkle | Dec. 1, 1925 |
| 1,715,397 | Whitehead | June 4, 1929 |
| 1,715,840 | Janette | June 4, 1929 |
| 2,251,465 | Patch | Aug. 5, 1941 |
| 2,519,948 | Willits | Aug. 22, 1950 |
| 2,530,532 | Moody | Nov. 21, 1950 |
| 2,571,672 | Bradley | Oct. 16, 1951 |